(12) United States Patent
Lorenc (10) Patent No.: US 6,810,664 B1
(45) Date of Patent: Nov. 2, 2004

(54) SLOTTED SPOOL VALVE

(75) Inventor: Allan Louis Lorenc, Oelwein, IA (US)

(73) Assignee: Rawson Control Systems, Inc., Oelwein, IA (US)

( * ) Notice: Subject to any disclaimer, the term of this patent is extended or adjusted under 35 U.S.C. 154(b) by 66 days.

(21) Appl. No.: 10/287,374

(22) Filed: Nov. 4, 2002

(51) Int. Cl.[7] .............................................. F16D 31/02
(52) U.S. Cl. ................ 60/468; 137/625.29; 137/625.32
(58) Field of Search ..................... 60/468, 428; 91/180, 91/503; 137/625.29, 625.32, 599.11, 269

(56) References Cited

U.S. PATENT DOCUMENTS 3,703,810 A * 11/1972 Rawson et al. ........... 91/375 R
5,467,800 A * 11/1995 Sallas .................... 137/625.65

* cited by examiner

Primary Examiner—Edward K. Look
Assistant Examiner—Michael Leslie
(74) Attorney, Agent, or Firm—Hugh D. Jaeger (57) ABSTRACT

A slotted spool valve for a speed control apparatus offering rapid response to prevent speed searching and cogging at low speed settings. Round port spool valve arrangements are replaced with a valve arrangement having rectangular-shaped ports. Response of the rectangular-shaped ports provides for rapid and sufficient fluid flow or bypass with less movement of a control shaft than that required for use with round port spool valve arrangements.

4 Claims, 7 Drawing Sheets

ROUND PORTS

FIG. 7a
PRIOR ART

RECTANGULAR PORTS

FIG. 7b

ROUND PORTS

FIG. 7c
PRIOR ART

RECTANGULAR PORTS

FIG. 7d

SLOTTED SPOOL VALVE

CROSS REFERENCES TO RELATED APPLICATIONS

This patent application is an improvement over the invention by the same inventors entitled "Speed Control Apparatus" which forms the subject matter of U.S. Pat. No. 3,703,810 issued Nov. 28, 1972.

BACKGROUND OF THE INVENTION

1. Field of the Invention

The present invention is for a slotted spool valve for use in a speed control apparatus.

2. Description of the Prior Art

The prior art speed control apparatus disclosed in U.S. Pat. No. 3,703,810 includes an arrangement of gears and other components which operates a rotary spool valve 22 in a manifold 17 in which the rotary spool valve 22 resides. Variation from the desired controlled speed as sensed or determined by an input shaft 14, such as caused by imposing a load on the hydraulic motor 10 referred to in said patent 3,703,810, for example, would cause rotation of the rotary spool valve 22 to decrease the amount of pressurized hydraulic fluid bypassed in the manifold 17, thereby allowing increased porting of pressurized hydraulic fluid to the motor 10 and thereby compensating for the speed of the motor, such compensation being of lasting duration or being only momentarily. Upon regaining and coming up to speed, or even when slightly overspeeding, such rotation speed is yet sensed by the input shaft 14, and the rotary spool valve 22 is rotatingly positioned in the opposite direction to establish or limit the revolutions per minute of the motor 10 by increasing the amount of pressurized hydraulic fluid bypassed, thereby decreasing the amount of ported pressurized hydraulic fluid to the motor 10. Such controlling or governing of motor speed at higher RPMs of the motor 10 virtually goes unnoticed to an observer as the compensations occur over fractions of a second. However, during desired lower RPM operation of the motor 10, undesirable speed variations become noticeable to an observer where speed variations, being sometimes referred to as cogging, are manifested when pressurized hydraulic fluid is delivered to the motor in a lagging or sluggish fashion. The relationship of the rotary spool valve 22 angular rotation to the amount of fluid at the motor 10 is such that the amount of fluid bypassed or not bypassed in a condition requiring compensation is not suitable to prevent noticeable cogging. The ports 24 which determine the amount of bypassing are circular in shape and as such do not provide for sufficiently decreased bypassing to allow for increased amounts of pressurized hydraulic fluid to be bypassed or delivered in a timely fashion to the motor 10 during low speed operation. Insufficiently pressurized hydraulic control fluid bypass or delivery allows the motor to laggingly slow and then to laggingly come up to speed (or approach overspeed) to cause cogging. Clearly, what is needed is a restructuring of the ports or orifices of a rotary spool valve to allow for bypass control to deliver and control sufficient quantities and pressure of pressurized hydraulic fluid in a timely fashion to prevent hydraulic motor speed variations and to stabilize rotation at low motor speeds.

SUMMARY OF THE INVENTION

The general purpose of the present invention is to provide a slotted spool valve for use in a speed control apparatus.

According to one embodiment of the present invention, there is provided a slotted spool valve the major components of which are a liner and a spool which is accommodated by the liner. The slotted spool valve can be incorporated into existing manifolds or can be incorporated into newly manufactured manifolds. The cylindrical liner is fabricated to be accommodated by a bore extending into or through a manifold and is sealingly fitted therein with a plurality of O-ring seals. Pressurized hydraulic fluid is delivered through the manifold to provide pressurized hydraulic fluid to a motor and to the slotted spool valve which can control motor speed by varyingly bypassing pressurized hydraulic fluid around the motor. A plurality of liner supply ports around and about the liner of the slotted spool valve communicate with and supply pressurized hydraulic fluid to one or more spool supply ports positioned on the spool of the slotted spool valve. The pressurized hydraulic fluid passes through the spool supply ports and through the interior of the spool to exit the spool at a plurality of rectangular-shaped spool bypass ports located around and about one end of the spool which communicate with a plurality of rectangular-shaped liner bypass ports located around and about the encompassing liner. Full communication of pressurized hydraulic fluid between the fully aligned rectangular-shaped spool bypass ports and the rectangular-shaped liner bypass ports results in bypassing the pressurized hydraulic fluid around the motor to cease or slow motor operation. Rotation of the spool toward lesser alignment of the rectangular-shaped spool bypass ports and the rectangular-shaped liner bypass ports results in reducing the bypassing, whereby the motor receives an increased share of pressurized hydraulic fluid to increase the motor speed. The relationship of the rectangular-shaped spool bypass ports and the rectangular-shaped liner bypass ports when compared to the relationship of round-shaped spool bypass ports and round-shaped liner bypass ports is such that only a small angular rotation of the spool in the slotted spool valve as rotationally positioned by an actuation shaft is required to produce the same degree of bypassing (or fluid delivery) as that produced by a valve having round bypassing ports and requiring a comparatively larger angular rotation by an actuation shaft of the spool having round liner or spool bypass ports. Or, for the same amount of actuation shaft rotation, a more rapid response is provided by the slotted spool valve where a proportionately larger passageway is provided due to the cross-section of the geometry provided therein. As such, response time of the motor is improved as pressurized hydraulic fluid is either bypassed about the motor or delivered to the motor in a more rapid fashion due to the increased sensitivity and shortened response time of the slotted spool valve incorporating rectangular-shaped spool bypass ports and rectangular-shaped liner bypass ports.

One significant aspect and feature of the present invention is the use of a slotted spool valve to control bypassing, metering or supply of hydraulic fluid to a hydraulic motor.

Another significant aspect and feature of the present invention is a slotted spool valve having a spool with rectangular ports and a liner with rectangular ports which are positioned with respect to each other to rapidly control the bypassing, metering of and supply of pressurized hydraulic fluid to a hydraulic motor.

Still another significant aspect and feature of the present invention is the use of a slotted spool valve incorporating rectangular ports to significantly increase responsiveness and sensitivity of a spool valve to increase the responsiveness of a hydraulic motor at low speeds.

Yet another significant aspect and feature of the present invention is the increased responsiveness and sensitivity of spool valves having rectangular-shaped spool and liner bypass ports over spool valves having round-shaped spool and liner bypass ports.

Another significant aspect and feature of the present invention is a slotted spool valve having a spool which can be rotatably positioned.

Having thus briefly described an embodiment of the present invention, it is the principal object of the present invention to provide a slotted spool valve having increased response and sensitivity for use in a speed control apparatus.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
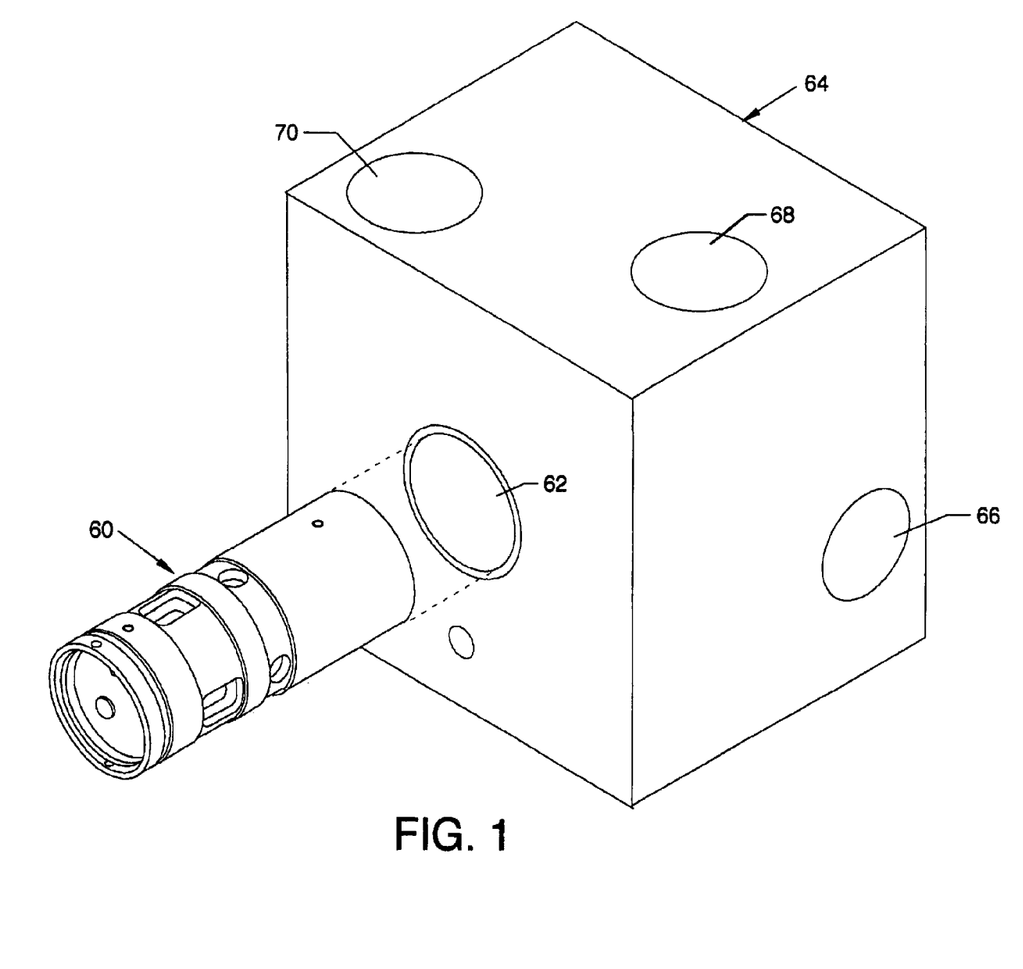
FIG. 1 is an isometric view of a slotted spool valve for a speed control apparatus, the present invention, aligned to a representative manifold.

FIG. 1 illustrates an isometric view of a spool valve for a speed control apparatus, herein called a slotted spool valve 60, an improved spool valve, which can be incorporated into the speed control apparatus described in U.S. Pat. No. 3,703,810 by the applicants. The slotted spool valve 60 is shown prior to alignment with a bore 62 extending through a representative manifold 64, different from but serving the same purpose as the manifold 17 of U.S. Pat. No. 3,703,810, which is detached from or which could be geometrically configured, if desired, to mount on or about or be connected to the motor 10 of U.S. Pat. No. 3,703,810. The manifold 64 includes at least an inlet attachment port 66 and a motor supply attachment port 68, which are in common, and an outlet attachment port 70, each port being appropriately connected and in communication with the slotted spool valve 60, as later described in detail.

Figure 2:
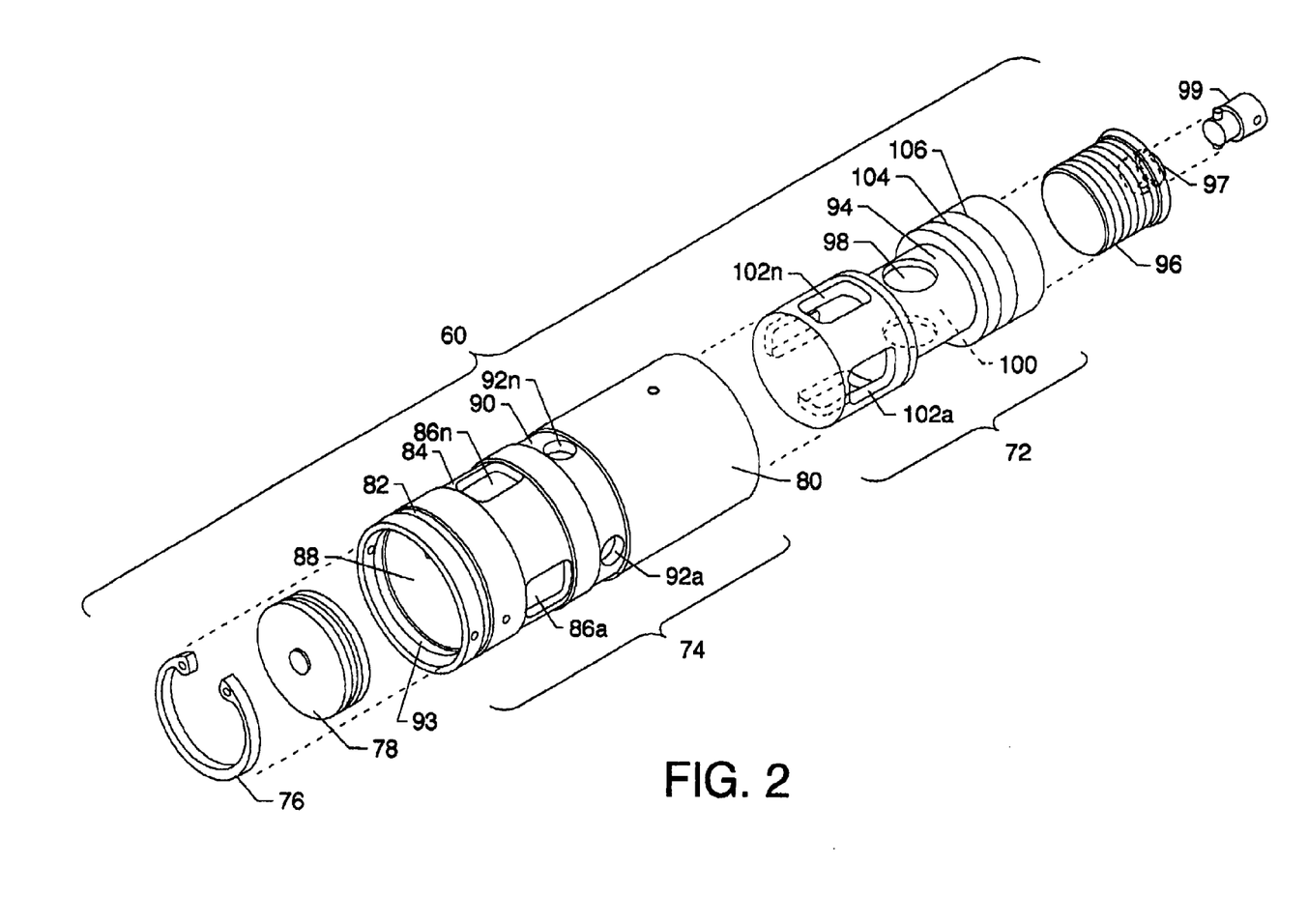
FIG. 2 is an exploded view of the slotted spool valve.

FIG. 2 illustrates an exploded view of the slotted spool valve 60, the present invention. The major components of the slotted spool valve 60 include a spool 72, which can be rotationally positioned, and a liner 74 into which the spool 72 and into which a snap ring 76 and a plug assembly 78 are aligningly accommodated. The liner 74 is shaped generally as a cylinder and includes an exterior surface 80 which is interrupted by an O-ring groove 82, an annular channel 84 having a plurality of rectangular liner bypass ports 86a–86n extending therethrough to a liner interior 88, an annular channel 90 having a plurality of liner supply ports 92a–92n extending therethrough to the liner interior 88, and an interior groove 93 for accommodation of the snap ring 76 which secures the plug assembly 78 in one end of the liner 74. The spool 72 is formed, in general, in cylindrical fashion being interrupted by an annular channel 94 through which one or more spool supply ports 98 extend therethrough to communicate with the spool interior 100. A plurality of rectangular spool bypass ports 102a–102n are located around and about one end of the spool 72 and extend therethrough to communicate with the spool interior 100. The spool 72 is closed on one end and sealed at the opposite end by a plug 96. The plug 96 includes a coupling receptor 97 for accommodation of a coupling 99 such as attached to the end of shaft 36 shown in U.S. Pat. No. 3,703,810. Grooves 104 and 106 encompass one end of the spool 72.

Figure 3:
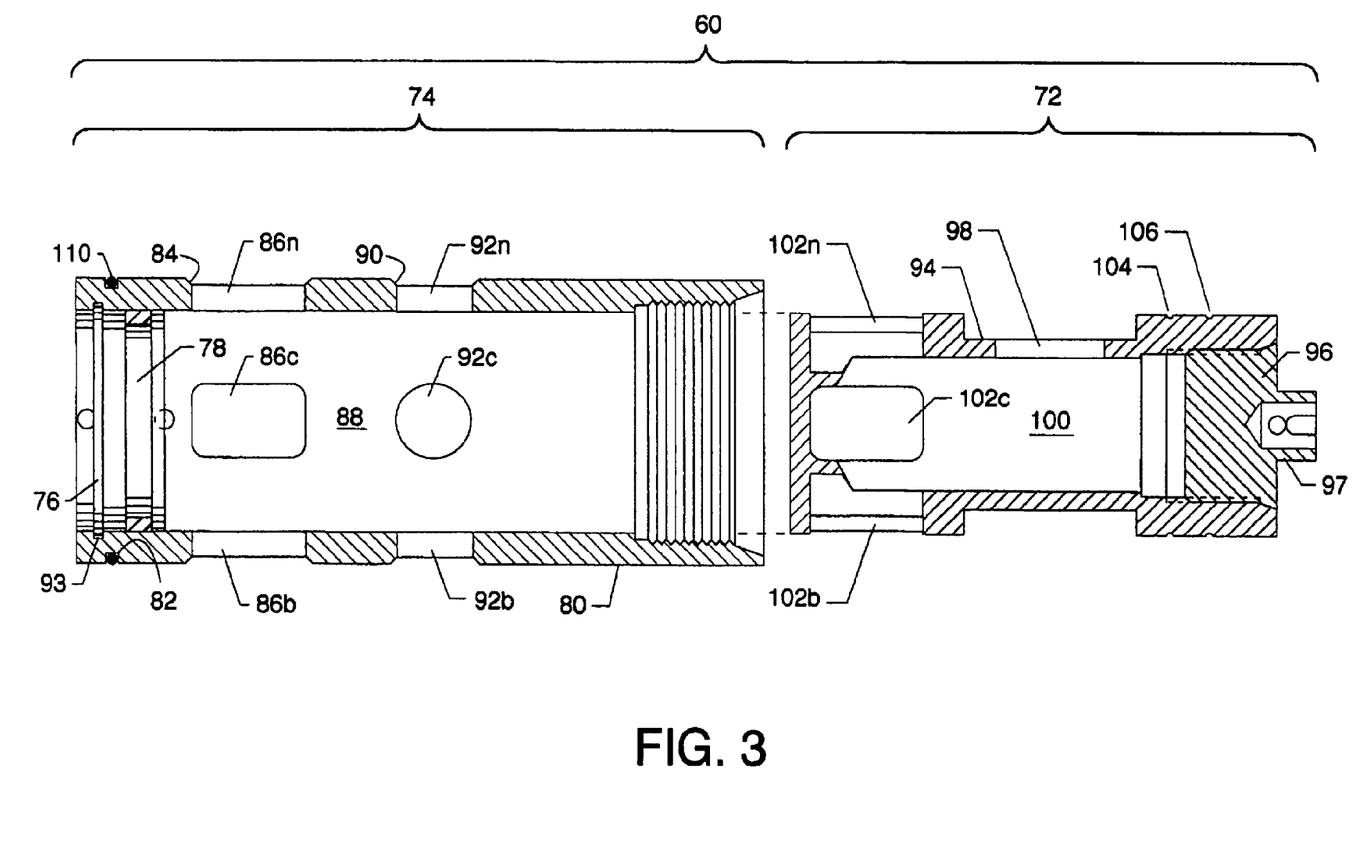
FIG. 3 is a cross sectional view of the assembled spool aligned with the assembled liner.

FIG. 3 illustrates an assembled view of the spool 72 and of the liner 74 in cross section.

Figure 4:
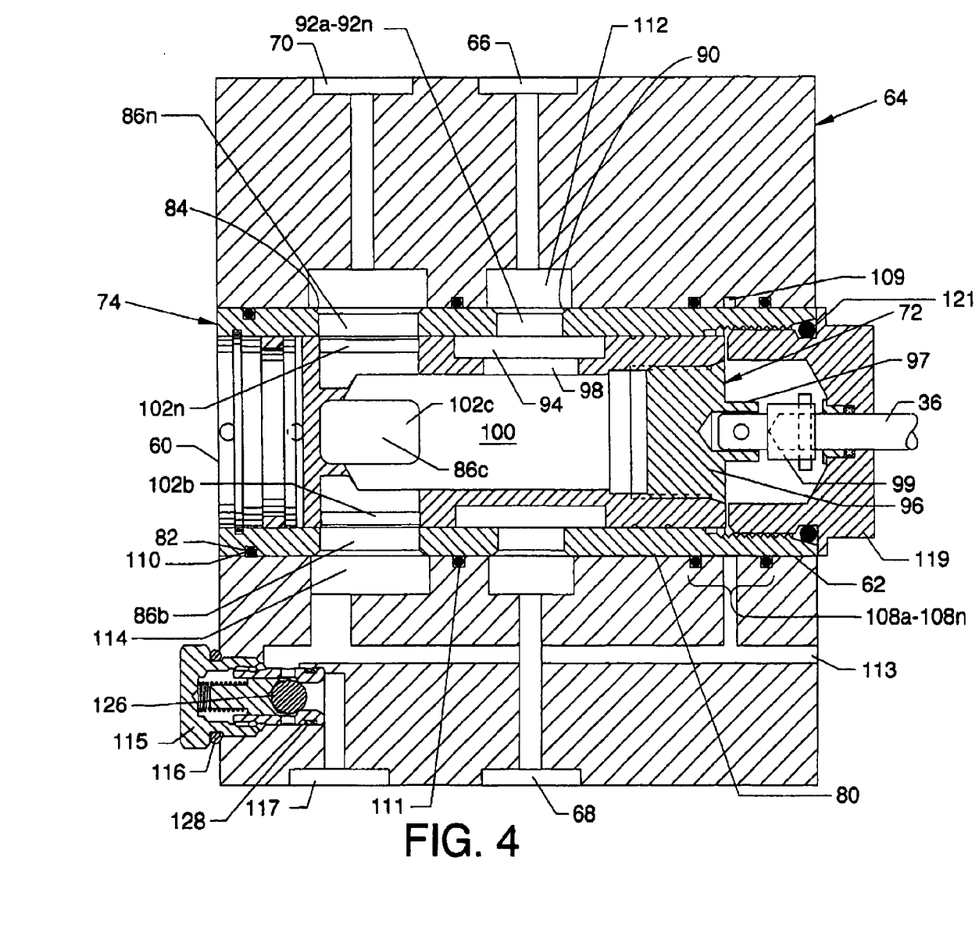
FIG. 4 is a cross sectional view of the slotted spool valve consisting of the liner and the contained the spool both residing in the bore of the manifold.

FIG. 4 illustrates the slotted spool valve 60 consisting of the liner 74 and the contained the spool 72 residing in the bore 62 of the manifold 64. The manifold 64 includes annular channels interrupting the bore 62 including an inlet channel 112 which is annular and which communicates through the inlet attachment port 66 and an outlet channel 114 which is also annular and which communicates through the outlet attachment port 70. The inlet channel 112 also communicates directly to the motor supply attachment port 68. The preceding mentioned ports 66, 68 and 70 are shown in simple form for the purposes of brevity and clarity.

The inlet channel 112 aligns closely to the annular channel 90 surrounding the liner 74 and as such communicates through the liner supply ports 92a–92n to the spool interior 100 via the annular channel 94 and the spool supply port 98 extending through the annular channel 94. Such communication, as described, is continuous regardless of the rotational position of the spool 72.

The outlet channel 114 aligns closely to the annular channel 84 surrounding the liner 74 and as such is in a position to variably communicate through the rectangular liner bypass ports 86a–86n of the liner 74 through the rectangular spool bypass ports 102a–102n of the spool 72 with the interior 100 of the spool 72. Such communication, as described, is variable depending on the angular rotational position of the spool 72. The spool 72 can be positioned to allow no communication therethrough or can be positioned to allow partial communication therethrough or can be positioned to allow full communication therethrough.

The exterior surface 80 of the liner 74 is in close juxtaposition with the bore 62 of the manifold 64, and the liner 74 is sealed by O-rings to seal the slotted spool valve 60 to and within the bore 62. A plurality of O-rings 108a–108n residing in O-ring grooves in the bore 62 of the manifold 64 seal against the exterior surface 80 of the slotted spool valve 60 at one end of the slotted spool valve 60, and another O-ring 110 residing in the O-ring groove 82 of the liner 74 seals the bore 62 of the manifold 64 at the opposing end of the slotted spool valve 60. An intermediate O-ring 111 residing in an O-ring groove in the bore 62 of the manifold 64 seals against the exterior surface 80 of the liner 74. An oil groove 109 in the bore 62 of the manifold 64 is connected to a passage 113 in the manifold 64. Passage 113 also connects to the rectangular liner bypass ports 86a–86n of the liner 74 through the outlet channel 114. A check valve 115 is located in the manifold 64 and sealed thereto by O-rings 116 and 128. The check valve 115 allows passage from the motor return port 117 to the outlet channel 114 with a restriction at the ball 126 to stabilize the motor 10. The check valve 115 will also ensure that the motor 10 will not run backwards. Also shown in FIG. 4 is a liner nut 119 threadingly engaged in one end of the liner 74 in close proximity to the plug 96 and sealed therein by an O-ring 121. The shaft 36 previously shown and described in U.S. Pat. No. 3,703,810 is accommodated by the liner nut 119 and extends therethrough to attach in a suitable manner to the coupling 99 which is accommodated by and attached in a suitable manner to the coupling receptor 97 at the one end of the spool 72.

Figure 5:
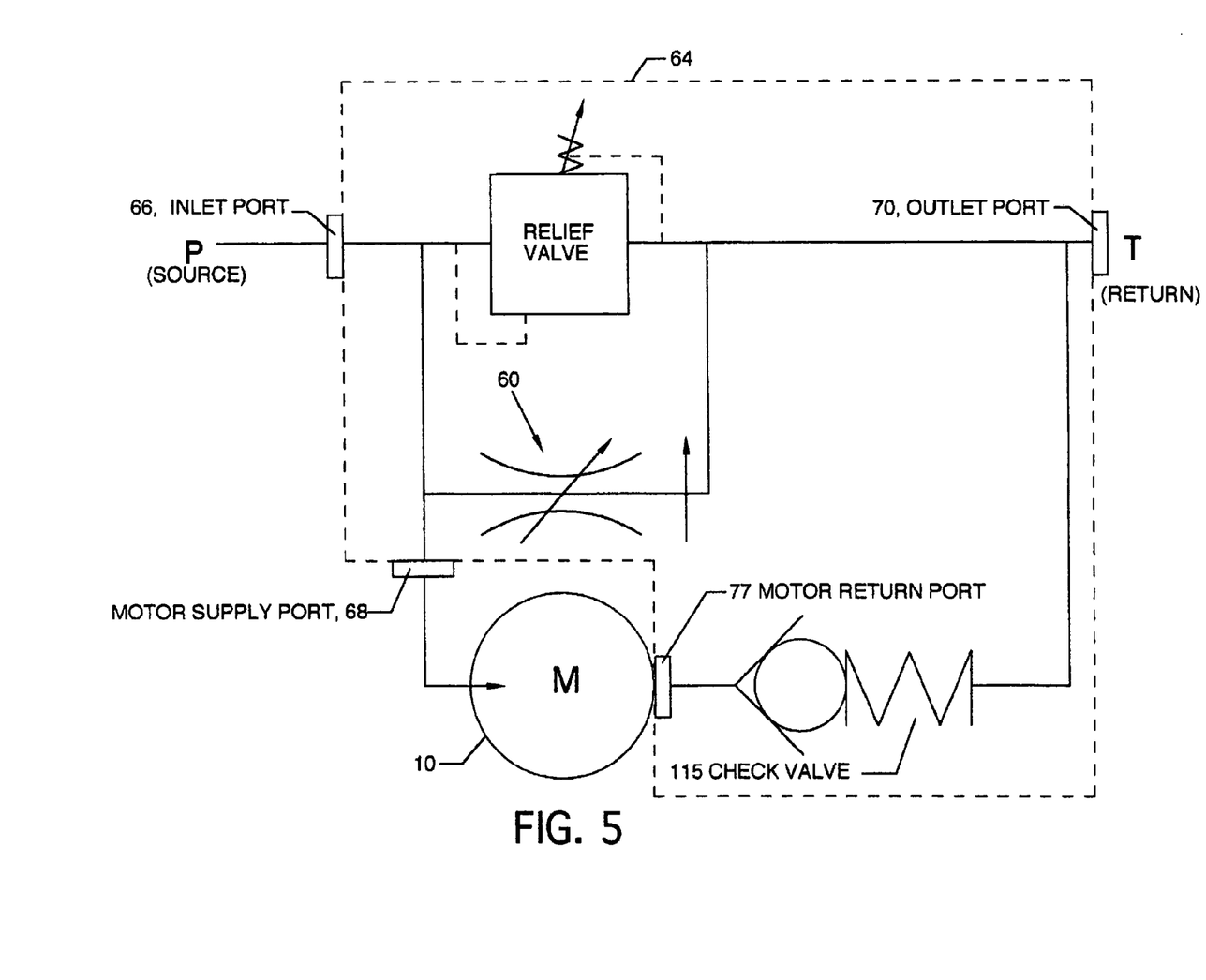
FIG. 5 is a hydraulic schematic showing the incorporation of the slotted spool valve within the manifold.

FIG. 5 is a hydraulic schematic showing the incorporation of the slotted spool valve 60 within the manifold 64 and the relationship thereof to a motor such as motor 10 shown in U.S. Pat. No. 3,703,810.

Figure 6:
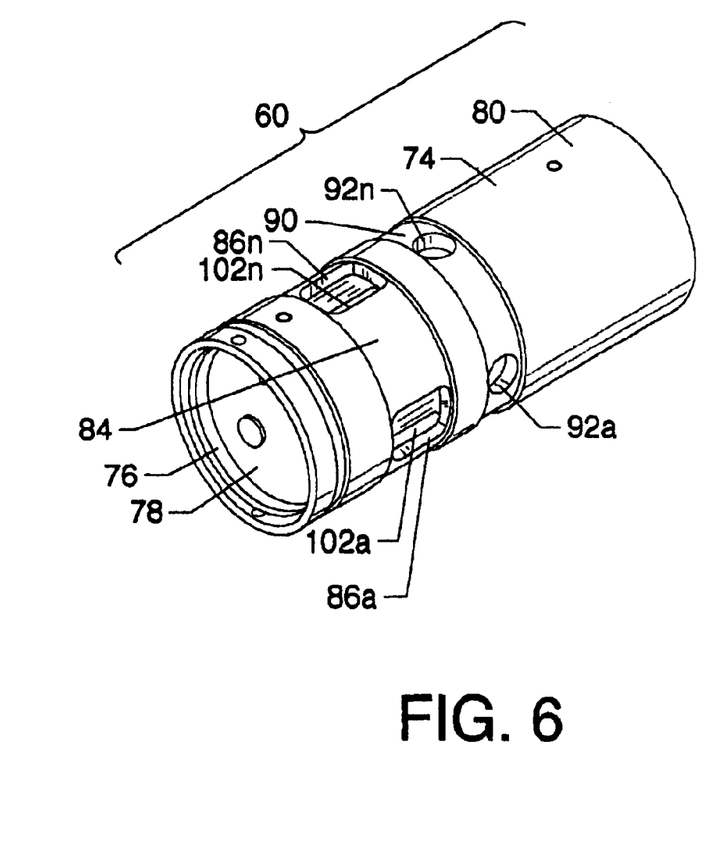
FIG. 6 is an isometric view of the slotted spool valve in the partially open position where the spool is at a position which allows a sufficient amount of hydraulic fluid to pass therethrough to maintain a desired hydraulic motor speed; and, FIGS. 7a–7d are views comparing a prior art spool valve (round ports) with the inventive slotted spool valve (rectangular ports).

FIG. 6 illustrates the slotted spool valve 60 in the partially open position where the spool 72 is at a position which allows a sufficient amount of hydraulic fluid to bypass therethrough to maintain a desired hydraulic motor speed as controlled by the mechanisms described in U.S. Pat. No. 3,703,810.

FIGS. 7a–7d illustrate a comparison of prior art spool valves incorporating round ports 24, such as incorporated in U.S. Pat. No. 3,703,810, with the rectangular ports of the slotted spool valve 60.

Figure 7A:
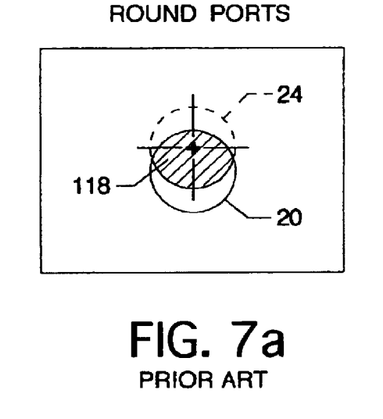
Figure 7B:
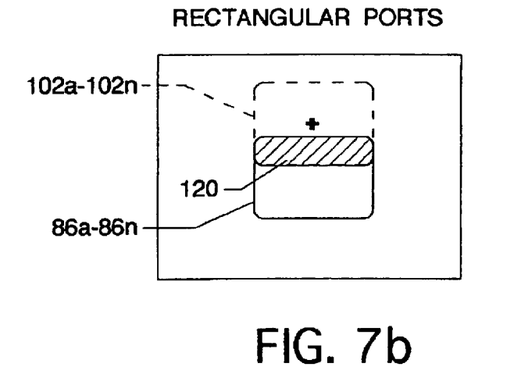

FIG. 7a shows the normal operating position of the prior art rotatable round port(s) 24 with respect to the bypass passage 20 and FIG. 7b shows the normal operating position of the rotatable rectangular spool bypass port(s) 102a–102n with respect to the rectangular liner bypass port(s) 86a–86n. The cross sections of bypass for FIGS. 7a and 7b, as shown by cross hatches 118 and 120, respectively, are identical in cross sectional area where each bypasses the same amount of hydraulic fluid to maintain a motor speed.

Figure 7C:
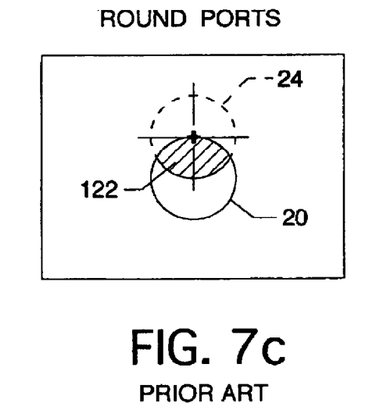
Figure 7D:
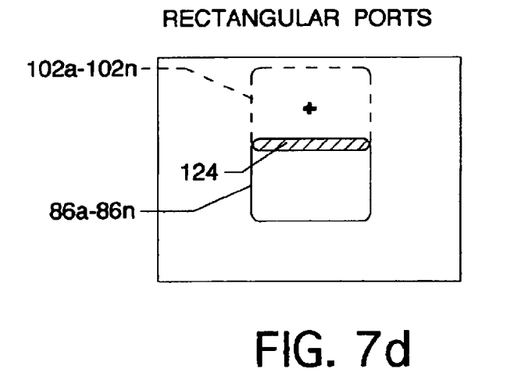

FIGS. 7c and 7d show the situation where a load is placed upon the motor whereby increased bypassing is invoked to allow a greater hydraulic delivery to the motor to allow the motor to handle the newly imposed load. FIG. 7c shows the components of FIG. 7a where a newly desired bypass cross hatch 122 of required size is produced by rotation of the port 24. Such rotation of the port 24 could be clockwise, and, for example of illustration and demonstration, could be 10°. FIG. 7d shows the components of FIG. 7b where a newly desired bypass cross hatch 124 of required size is produced by rotation of the ports 102a–102n. The area of the cross hatch 124 is equal to that of the cross hatch 122 (FIG. 7c) Such rotation of the ports 102a–102n could be clockwise, the same as for FIG. 7c, but the amount of rotation of the rectangular spool bypass ports 102a–102n to achieve the same cross section 122 is less than 10° such as described for rotation of the round port 24, and, for purposes of example and demonstration could be 5° of rotation. Because the rectangular spool bypass ports 102a–102n require less rotation to achieve an identical result, speed compensation response is increased significantly at a greater and faster rate than that provided for using the round port(s) 24. It follows that reduction of the load on the motor calls for a response to offer more bypassing calls for actuation of the ports in an opposite direction. Of course, less movement is required by the rectangular spool bypass ports 102a–102n, thus enhancing reduced response time. Such reduced response time in both directions is improved to a degree that speed hunting and searching is so quick and rapid that it is not discernible.

Various modifications can be made to the present invention without departing from the apparent scope hereof.

Slotted Spool Valve Parts List

20 bypass passage
24 round port
60 slotted spool valve
62 bore
64 manifold
66 inlet attachment port
68 motor supply attachment port
70 outlet attachment port
72 spool
74 liner
76 snap ring
78 plug assembly
80 exterior surface
82 O-ring groove
84 annular channel
86a–n rectangular liner bypass ports
88 liner interior
90 annular channel
92a–n liner supply ports
93 interior groove
94 annular channel
96 plug
97 coupling receptor
98 spool supply port
99 coupling
100 spool interior
102a–n rectangular spool bypass ports
104 groove
106 groove
108a–n O-rings
109 oil groove
110 O-ring
111 O-ring
112 inlet channel
113 passage
114 outlet channel
115 check valve
116 O-ring
117 motor return
118 cross hatch
119 liner nut
120 cross hatch
121 O-ring
122 cross hatch
124 cross hatch
126 ball
128 O-ring

What is claimed is:

1. A slotted spool valve comprising:

a. a cylindrical liner, the cylindrical liner having an exterior surface, an interior surface, a first end, and a second end, the exterior surface being interrupted by an O-ring groove, a first annular channel having a plurality of rectangular-liner bypass ports extending therethrough to the interior surface, and a second annular channel having a plurality of liner supply ports extending therethrough to the interior surface;

b. a cylindrical spool, the cylindrical spool being accommodated and contained by the cylindrical liner, and having a spool exterior, a spool interior, a spool first end and a spool second end, the spool exterior being interrupted by a plurality of rectangular-shaped spool bypass ports located around and about the spool and extending therethrough to the spool interior and communicating with the rectangular-shaped liner bypass ports, an annular channel having one or more spool supply ports extending therethrough to the spool interior and communicating with the liner supply ports, and a plurality of grooves encompassing the spool second end, the spool first end being closed, and the spool second and being sealed by a plug, the plug accommodating and attaching to the actuation shaft, action of the actuation shaft resulting in angular rotation of the spool toward greater or lesser alignment of the rectangular-shaped spool bypass ports and the rectangular-shaped liner bypass ports.

2. The slotted spool valve of claim 1, further comprising:
a. a manifold, having a bore and channels leading to the bore; and,
b. wherein the slotted spool valve is accommodated by the bore, and extends through the manifold, and is sealing refitted therein with a plurality of O-ring seals, allowing pressurized hydraulic fluid to be delivered through the manifold to provide the pressurized hydraulic fluid to a motor, the slotted spool valve controlling motor speed by angularly rotating the spool of the slotted spool valve toward greater or lesser alignment of the rectangular-shaped spool bypass ports and the rectangular-shaped liner bypass ports to varyingly bypass the pressurized hydraulic fluid around the motor.

3. The slotted spool valve of claim 1, wherein the relationship of the rectangular-shaped spool bypass ports and the rectangular-shaped liner bypass ports when compared to the relationship of round-shaped spool bypass ports and round-shaped liner bypass ports is such that only a small angular rotation of the spool in the slotted spool valve as rotationally positioned by actuation shaft is required to produce the same amount of bypassing as that produced by a valve having round bypassing ports and requiring a comparatively larger angular rotation by an actuation shaft of the spool valve having round liner or spool bypass ports.

4. The slotted spool valve of claim 1, wherein there is a linear relationship between the rotation of the spool relative to the liner and the bypass overlap of the rectangular liner ports and the rectangular spool ports.

* * * * *